(12) United States Patent
Van Genechten (10) Patent No.: US 12,397,223 B2
(45) Date of Patent: Aug. 26, 2025

(54) SET OF PLAYING CARDS (71) Applicant: CARTAMUNDI SERVICES NV, Turnhout (BE)

(72) Inventor: Erik Van Genechten, Geel (BE)

(73) Assignee: CARTAMUNDI SERVICES NV, Turnhout (BE)

( * ) Notice: Subject to any disclaimer, the term of this patent is extended or adjusted under 35 U.S.C. 154(b) by 713 days.

(21) Appl. No.: 17/784,772

(22) PCT Filed: Sep. 7, 2021

(86) PCT No.: PCT/EP2021/074587
§ 371 (c)(1),
(2) Date: Jun. 13, 2022

(87) PCT Pub. No.: WO2022/058200
PCT Pub. Date: Mar. 24, 2022

(65) Prior Publication Data
US 2023/0062375 A1    Mar. 2, 2023

(30) Foreign Application Priority Data

Sep. 21, 2020   (EP) ..................................... 20197124

(51) Int. Cl.
*A63F 1/00*   (2006.01)
*A63F 1/02*   (2006.01)
*A63F 1/06*   (2006.01)
*A63F 1/14*   (2006.01)
*G06V 30/19*  (2022.01)

(52) U.S. Cl.
CPC ................ *A63F 1/02* (2013.01); *A63F 1/062* (2013.01); *A63F 1/14* (2013.01); *G06V 30/19007* (2022.01)

(58) Field of Classification Search
None
See application file for complete search history.

(56) References Cited

U.S. PATENT DOCUMENTS

| 9,254,435 | B2 | 2/2016 | Miller et al. |
| 2011/0130185 | A1 | 6/2011 | Walker |
| 2015/0014925 | A1 | 1/2015 | Miller et al. |
| 2019/0091556 | A1 | 3/2019 | Shigeta |

FOREIGN PATENT DOCUMENTS

| AU | 2013203307 A1 | 4/2014 |
| CA | 2460850 A1 | 12/2002 |
| CN | 109529310 A | 3/2019 |
| TW | 201332620 A | 8/2013 |

OTHER PUBLICATIONS

Search Report from corresponding European Application No. 20197124.9, Mar. 2, 2021.
International Search Report from PCT Application No. PCT/EP2021/074587, Jan. 5, 2022.

*Primary Examiner* — Paul A D'Agostino
(74) *Attorney, Agent, or Firm* — Workman Nydegger (57) ABSTRACT

A set of playing cards comprises N playing cards, N>1, each playing card having a detectable card identity string. This card identity string is a series of M characters. The set of playing cards is provided with a set identity string, this set identity string being composed of N groups of R characters, R<=M. Each card identity string provides to the set identity string one group of R characters taken from the series of M characters of this card identity string. The sequence of said N groups of R characters in the set identity string is identical to the sequence of the N cards in the set of playing cards.

17 Claims, 6 Drawing Sheets

SET OF PLAYING CARDS

FIELD OF THE INVENTION

The present invention generally relates to playing cards and to sets of playing cards such as randomized playing cards, typically sets of casino playing cards. The invention in particular concerns such sets of playing cards that reduces the risk for fraud and/or game outcome prediction.

BACKGROUND OF THE INVENTION

Card playing games are very popular in casinos and similar institutes. As the possible return on a placed bet is high, such card games are very vulnerable for potential fraud and cheating.

A first source of potential fraud and cheating are arrangements made between dealer and players, e.g. signals being given in relation to the next cards being dealt. For this reason, it is made quite impossible for the dealer to see the next card when dealing. Sophisticated shoes and card dealing systems are made to prevent information on next card(s) to dealers and players.

Another source of fraud or cheating is leaked information on the sequence cards are present in the set of cards used during the game, which information is gained in the production process and during transport of the set of cards from card and set manufacturer, via locked area of casinos to the table where the set of cards is dealt. To reduce the risk on leaking of information, the transport and production chain is kept as short as possible, both in time and distance.

A next source of possible fraud and cheating is information of card identity (rank and suit) linked to minor defects visible on the cards itself. Such minor defects can be minor colour deviations, deviations of printed pattern on the cards, minor deviation of the rectangular shape due to imperfect cutting of cards and alike. A high level of quality control is used to reduce or even take away any kind of card defects.

Finally, also a source of possible fraud and cheating, can be the use of false cards which are entered in the set of cards, either during the game itself, or during production and transporting of the set of cards to the table where they are dealt.

SUMMARY OF THE INVENTION

According to a first aspect, a set of playing cards is provided. A set of playing cards comprises N playing cards, N>1, each playing card having a detectable card identity string. This card identity string is a series of M characters. The set of playing cards is provided with a set identity string, this set identity string being composed of N groups of R characters, R<=M. Each card identity string provides to the set identity string one group of R characters taken from the series of M characters of this card identity string. The sequence of said N groups of R characters in the set identity string is identical to the sequence of the N cards in the set of playing cards.

The card identity string thus may be obtained by concatenation of R characters taken from each of the N card identity strings, taken in the order as the cards occur in the set of cards.

Hence the first group of the N groups of R characters in the set identity string are the R characters taken from the first playing card in the set of playing cards, the second group of the N groups of R characters in the set identity string are the R characters taken from the second playing card in the set of playing cards, etc.

The set identity string hence holds information on the order of cards present in the set. This information string may be used as a control tool when the set of playing cards is used, e.g. dealt. When drawing cards from the set of playing cards, reading or obtaining the card identity string, and identifying the R characters of this card identity string, one can compare these R characters with the R characters in the set identity string. If there is a fit between the R characters of the card identity string and the R characters of the set identity string at appropriate position in the string, the position of the card in the set is correct. If there is a discrepancy, likely something happened to the position of this card in the set of cards, which may be an indication of fraudulent activity or cheating.

The cards in the set of playing cards are preferably randomized, meaning that the N cards present in the set may be shuffled, and have a sequence which is not ordered in an organized way in view of rank and/or suit of the cards.

According to some embodiments, the card identity string may be printed on the face side of the playing card.

According to some embodiments, the card identity string may be encrypted into a card identity code.

This encryption may use a given encryption key, hence allowing the card identity code to be decrypted back into the card identity string.

Instead of the card identity string, this card identity code may be printed on the playing card.

According to some embodiments, the card identity code may be printed on the face side of the playing card.

This first encryption assures that, in case the card identity string holds information on the cards rank and suit or any other relevant information, when reading of the card identity code, this does not cause the information on rank and suit or any other relevant information to be available too easily. One needs the encryption/decryption key of this first encryption, to reveal this rank and suit or any other relevant information.

The set identity string and/or set identity code, as will be set out further, can be kept together with the set of playing cards. As an example, the set identity code, which can be a series of characters as well, may be printed on the packaging of the set of playing cards or on the seal used to seal the package.

The card identity string and/or card identity code may be printed on the face side of the card more than once, e.g. 2, 3 or 4 times, to facilitate more easily recognition and reading of the string or code.

N, M and R are positive integers.

N is a positive integer larger than 1. N may e.g. be 52 or more, e.g. 54 or more, such as a multiple of 52. Most preferred, the set comprises one or more decks of playing cars, such as 1, 2, 3, 4, 5, 6, 7, 8, 9 or 10 decks. Each deck comprises 13 cards of four suits: clubs, diamonds, spades and hearts. The 13 cards each have a different rank, being ace, king, queen, jack and 9 to 2. Optionally other playing cards may be present in the set of playing cards, which other playing cards have a function in the game intended to be played with this set of playing cards.

M is preferably between 1 and 40, such as more than 1, more than 2, more than 3 or even more than 4, and less than 4, such as less than 35, e.g. less than 30, even less than 25. Preferably, M is between 2 and 20.

R is preferably between 1 and 40, such as more than 1, more than 2, more than 3 or even more than 4, and less than 4, such as less than 35, e.g. less than 30, even less than 25. Preferably, R is between 1 and 20, such as between 1 and 10, e.g. between 1 and 8, e.g. 1, 2, 3, 4, 5, 6, 7 or 8.

According to some embodiments, R may have a value between 1 and 5.

Characters are to be understood as characters chosen from the alphabet, the figures 0 to 9, punctuation marks and special characters like &, @, #, §, $, £, €, any other ASCII character and alike.

Preferably the characters are characters chosen from the alphabet and the figures 0 to 9. Possibly, the characters are characters chosen from the figures 0 to 9 and A to F, thereby providing hexadecimal codes and strings. Possibly, the characters are characters chosen from the figures 0 to 9, thereby providing decimal codes and strings. More preferred, the card identity string and the set identity string are composed of the characters 0 and 1, thereby providing binary codes and strings.

The card identity string may be printed on the playing card. The card identity string, or as further will be explained, a card identity code, is detectable, meaning that it can be read from one of the faces of the card by using appropriate illumination and reading means. It may be detected and read under ambient illumination by a vision system, e.g. a camera, and visible by the naked eye. It may also be provided using invisible ink, which only becomes visible, hence detectable under special illumination, like under UV light.

According to some embodiments, the set identity string may be encrypted into a set identity code This encryption may use a given encryption key, hence allowing the set identity code to be decrypted back into the set identity string.

Instead of the set identity string, this set identity code may used as information accompanying the set of playing cards.

The use of encrypted strings into codes, may further reduce the risk on fraudulent activity. The identity of the R characters of both the cad identity string and the set identity string is not readily available and readable and needs complex manipulation of the code using usually encryption/decryption keys which are held secret.

According to some embodiments, the set of playing cards may be packed in a sealed package, the set identity code being printed on the package and/or seal.

According to some embodiments, the card identity string may comprise information on rank and suit of said playing card.

A given number A1 of characters in the card identity string, A1<M, may be one-on-one linked to the rank and suit of the card. As an example, A1 equals 6 or more, each card of different rank and suit is ono-on-one linked to a binary sequence of 6 or more characters 0 or 1. Preferably there is an absence of any logic between the cards with successive rank and identical suit, and the content of the A1 characters contributed to each of these cards.

According to some embodiments, the set of playing cards may comprise B decks of playing cards, B>1, the card identity strings comprise information on the deck to which the card belongs in the set of cards.

A given number A2 of characters, A2<M, may be one-on-one linked to one of the B decks in the set. As an example, B equals 8, A2 is one character, A2 equals a figure between 1 and 8, i.e. the number of the deck the card belongs to. A2 equals 1 if the card belongs to the first deck, A2 equals 2 if the card belongs to the second deck, etc.

As an alternative, A2 is a sequence of 3 characters being either 0 or 1. A2 equals 000 if the card belongs to the first deck, A2 equals 001 if the card belongs to the second deck, etc. and A2 equals 111 if the card belongs to the eighth deck.

It is understood, if the card identity strings comprise also information on rank and suit of said playing card by means of A1 characters, A1 and A2 together must be smaller or equal to M.

According to some embodiments, the card identity strings may comprise information on
  the date and/or time of printing of the card and/or
  the location where the card is printed and/or
  the company printing the card and/or
  the type of game the card is printed for and/or
  the brand of the card and/or
  the casino for which the cards is printed.

According to some embodiments, the card identity strings may comprise a serial number and/or a random number.

Preferably this serial or random number may preferably comprise 1 to 40 characters, such as 1 to 20 characters. As an example, this serial or random number may preferably comprise more than 1, more than 2, more than 3 or even more than 4, and less than 4, such as less than 35, e.g. less than 30, even less than 25 characters. Preferably, this serial or random number comprises is between 1 and 20 characters, such as between 1 and 10, e.g. between 1 and 8, e.g. 1, 2, 3, 4, 5, 6, 7 or 8.

For a group of R characters taken from the M characters of the card identity string, the position of the R characters in the string of M characters preferably always identical. So for the R characters and integers $p_1$ to $p_R$ representing the positions in the string of M characters, $p_1$ to $p_R$ are integers between 1 and M. Preferably, though not necessarily, $p_1$ to $p_R$ are sequential figures, i.e. for integer q varying between 2 and R, $p_q = p_{q-1} + 1$.

According to some embodiments, the group of R characters taken from the series of M characters of the card identity string may be a group of R sequential characters out of the series of M characters of this card identity string, the first of the R sequential characters being always the character on the same position in the series of M characters of the card identity strings.

According to some embodiments, the card identity string or if applicable the card identity code may be printed using a UV visible ink Preferably an ink is used which is UV visible, but invisible by naked eye under ambient lighting.

The card identity string or code might not be visible by the naked eye. The card identity string or code may be visible, hence detectable, by UV illumination only, or by radiation with non-visible light of a given wavelength or wavelength range. UV illumination sources, such as LED UV illumination may be used to make the card identity string or code readable using an appropriate camera system.

The card identity string and/or if applicable the card identity code is represented on the card by means of a barcode, a QR code, a snap tag, a binary code and/or a set of characters.

According to some embodiments the card identity string or code may be printed using micro-dot encryption. The use of micro-dots to identify the rank and suit of cards on the face side of a card is known from U.S. Pat. No. 9,254,435.

Sets of playing cards according to the first aspect of the invention, have several advantaged. It is quite counter-intuitive to identify each card, when cards are used in card games where sequences of cards need to random and unpredictable. Marked cards have always been out of the question. Still the identification may allow to set up a control system to reduce the risk on fraud and cheating, e.g. by fraudulent card exchanges. This is even more the case when the card identity is invisible for the naked eye.

Playing cards with a card identity string and/or code are part of a set of playing cards. Once the set of playing cards is made, the sequence of the playing cards being member of the set, are known to the producer. When, at whatever moment in time, the card identity string or code in the set of playing cards are checked, any false card being part of the set of playing cards will be detected. In case during playing of the game, the card identity strings are read, or the card identity codes are read and decrypted not the string, and the R characters of the read or converted string is compared to the set identity string, it is not possible to deal a card which was originally not part of the set of cards.

As such, an instant read out of the card identity string, or code with conversion back to the string, when being dealt may be used as a control. If the playing card being dealt is not the next card in the sequence, this may point to an unallowed handling of the set of playing cards having taken place, or to fraudulent card exchange having taken place. Hence this also may point to an attempt of fraud or cheating.

In practice a dealer shoe may read card identity string or code, and the read data can be forwarded to a central processing unit. The latter may decrypt the code back into the card identity string. The R characters of the card identity string can be selected and compared to the relevant characters in the set identity string, optionally being obtained by decryption of the set identity code, which should be linked to this card. If there is no match, there is indication of fraud or defective card manipulation.

According to a second aspect of the invention, a method for dealing playing cards from a set of playing cards is provided, the method comprising Providing a set of playing cards according to any one of the preceding claims;
Providing a dealing shoe which is fit to read the card identity string or if applicable the card identity code
Reading the card identity string or if applicable card identity code;
Extract and compare the R characters of the card identity string to the characters in the set identity string.

According to some embodiments, the method for dealing playing cards from a set of playing cards, may comprise A. Providing a set of playing cards according to any one of the preceding claims;
B. Providing a dealing shoe which is fit to read the card identity string or if applicable the card identity code
C. Providing a processing unit fit for
   If applicable decrypting a card identity code into a card identity string;
   If applicable decrypting a set identity code into a set identity string;
   Extracting the R characters from the card identity string and
   Comparing the R characters from the card identity string with the set identity string.
D. Inserting said set of playing cards in said dealing shoe
E. Providing the set identity string or if applicable card identity code to the processing unit;
F. Drawing a playing card from the dealing shoe;
G. Reading the card identity string or if applicable card identity code by the dealing shoe and providing the card identity string or if applicable card identity code to the processing unit,
H. If applicable decrypt the card identity code to the card identity string
I. Extract and compare the R characters of the card identity string to the characters in the set identity string;
J. Repeat steps F to I as long as step I provides equality between the R characters of the card identity string to the characters in the set identity string
K. Signal said deficiency when step I provides non equality between the R characters of the card identity string to the characters in the set identity string.

N is a positive integer larger than 1.

The signal can be a visual or auditive signal, like an alarm. The processing unit can be part of the dealing shoe itself or can be a remote processing unit, e.g. a processing unit being part of a device controlling the game being played.

The features of one aspect of the invention can be combined with features of the other aspects of the invention, as long as there is no technical incompatibility.

When ranges are mentioned, ranges are inclusive, except otherwise indicated.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The same reference signs refer to the same, similar or analogous elements in the different figures.

DESCRIPTION OF ILLUSTRATIVE EMBODIMENTS

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

Figure 1:
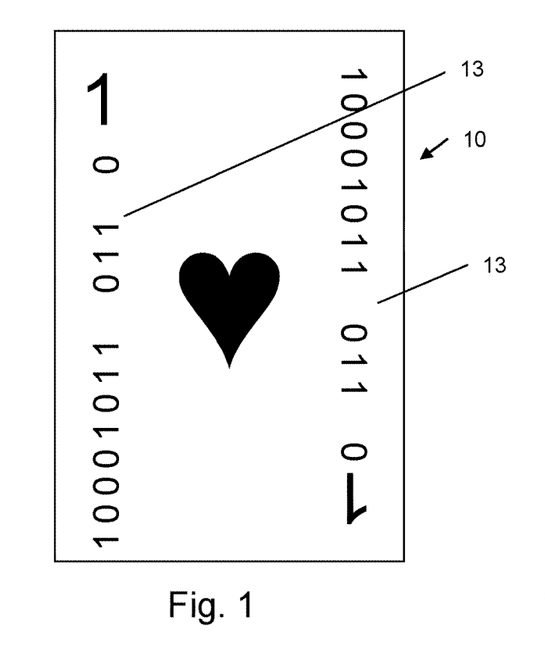
FIG. 1 is a schematical view of a playing card being part of a set of playing cards according to the invention.

A playing card being part of a set of playing cards according to the invention is shown in FIG. 1. The set of playing cards comprises, as an example, 8 decks of 52 cards. Hence N is 416. The playing card 10, in this case the ace of hearts, carries a card identity string 13. This card identity string 13 is printed using UV visible ink, and is not visible by the naked eye under ambient illumination.

Figure 2:
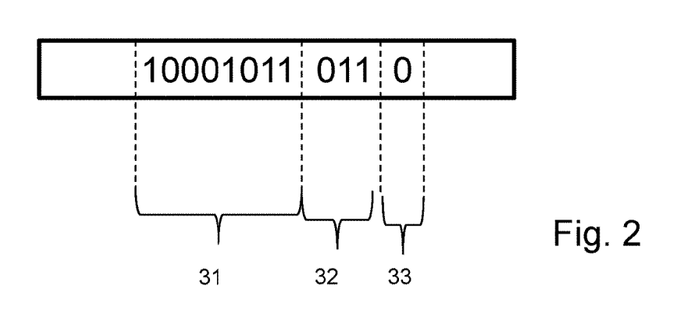
FIG. 2 shows schematically the card identity string of the card of FIG. 1.

As shown in FIG. 2, the card identity string 13, being a binary string of characters 0 and 1 can constitute out of several character groups 31, 32 and 33. The first group 31 is a string of characters one-on-one linked to the rank and suit of the playing card. So in the example as shown in FIGS. 1 and 2, the ace of hearts is linked with the string "10001011". All aces of diamond in the set of playing cards will have this string as the first 8 digits in its card identity string. These first groups 31 may be obtained giving each card a card number from 1 to 52 and converting the card number into said string by encrypting the card number using a given encryption value.

The second group 32 is a sequence of 3 characters being either 0 or 1. Group 32 equals 000 if the card belongs to the first deck present in the set of playing cards. group 302 equals 001 if the card belongs to the second deck, etc. This means that for this particular card shown in FIGS. 1 and 2, the card belongs to the $4^{th}$ deck present in the set of playing cards.

It is understood that this second group 32 of characters may have more than 3 characters, e.g. 4, 5 or more. In an alternative embodiment, this group may e.g. be a random generated group of a given number of characters.

The third group 33 is a control digit. As an example, it represents 0 if the string of digits provided by groups 31 and 32 comprises an even number of "1", and is 1 if the string of digits provided by groups 31 and 32 comprises an odd number of "1".

Figure 3:
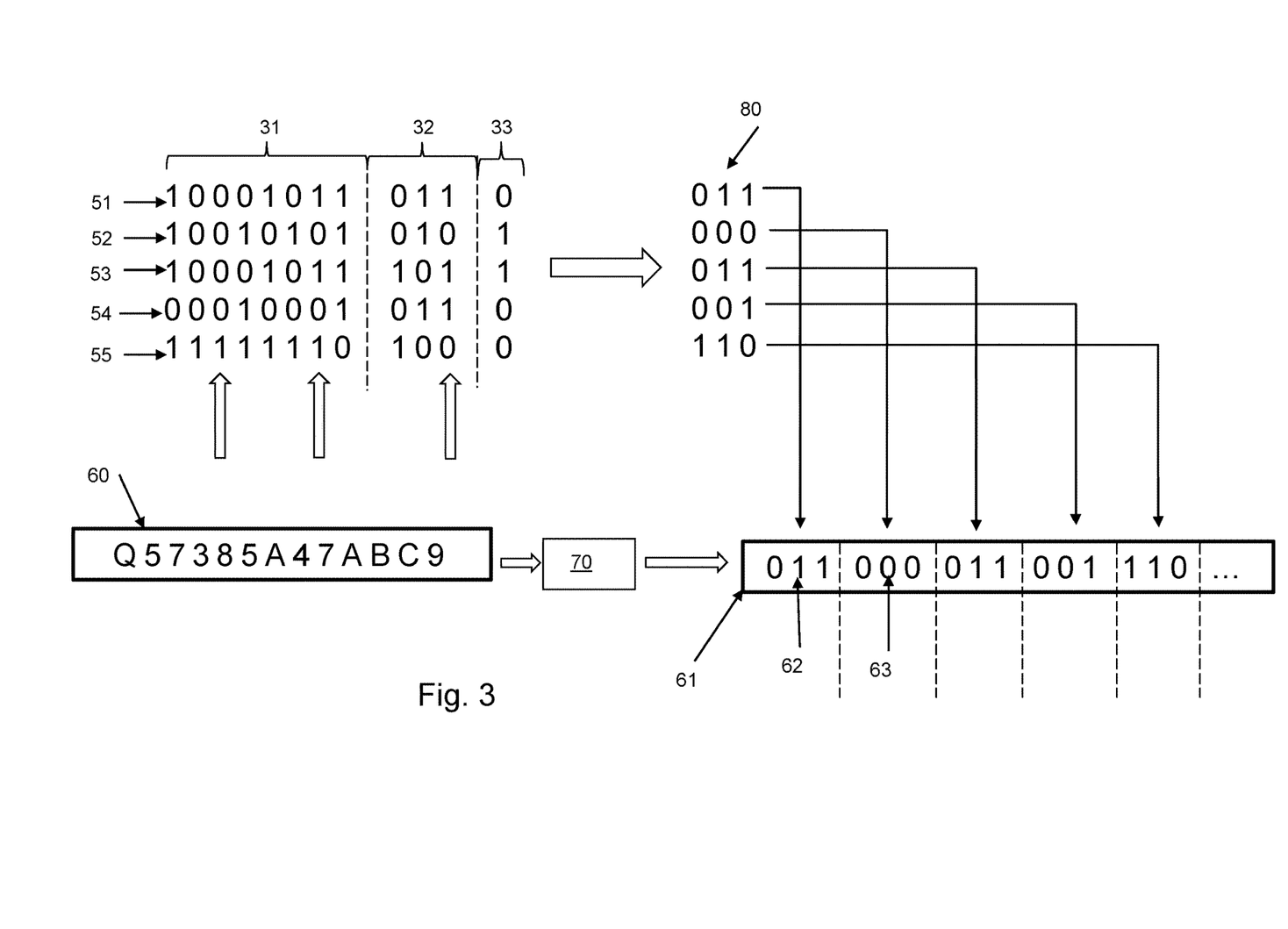
FIG. 3 shows how a set identity string and set identity code is configured out of card identity strings.

FIG. 3 shows 5 card identity strings of 5 consecutive cards 51 to 55 in the set of playing cards. In this set of plying cards, card 51 is equal to the card 10 of FIG. 1. Card 53 is an ace of hearts, but from the $4^{th}$ deck of cards in the set. Card 54 will be a cart different from the ace of hearts, but it is a card also from the $5^{th}$ deck.

The set identity code 60 is a series of characters, each character being from the group consisting of the alphabet and the numbers 0 to 9. by means of an appropriate decoding key or algorithm 70, the set identity code can be converted in the set identity string 61. From each card identify string, the 3th, $7^{th}$ and $11^{th}$ character is chosen as the group 80 of R characters, in this embodiment 3 characters. The first 3 characters 62 in the set identity string will be the 3th, $7^{th}$ and $11^{th}$ character of the card identity string 51, i.e. of the first card in the set of cards. The next 3 characters 63 in the set identity string will be the 3th, $7^{th}$ and $11^{th}$ character of the card identity string 52, i.e. of the second card in the set of cards, etc. As such, all groups of R characters are concatenated one after the other in the order identical to the order in which the respective cards are present in the set of cards.

Figure 4:
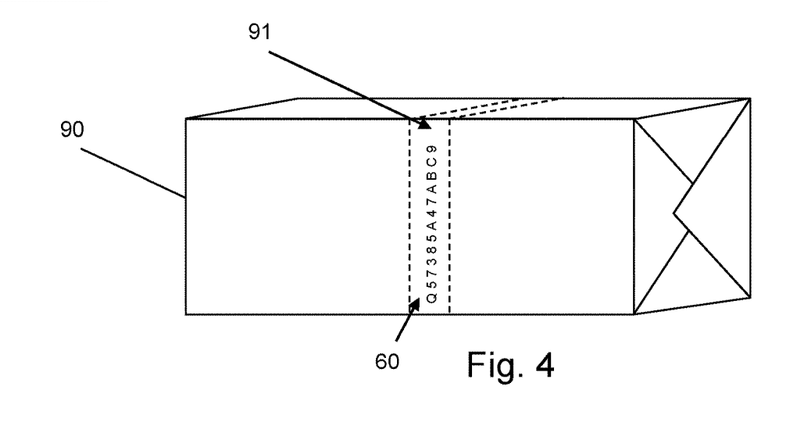
FIG. 4 shows a set of cards according to the invention.

As such, the packed set of cards 90 in FIG. 4, having a seal 91 showing the set identify code 60, can be used for playing a card game, e.g. baccarat, during which game the sequence of cards in the set can be monitored whether this sequence equals the original one when the set was created and the set identity string and code were generated.

Figure 5:
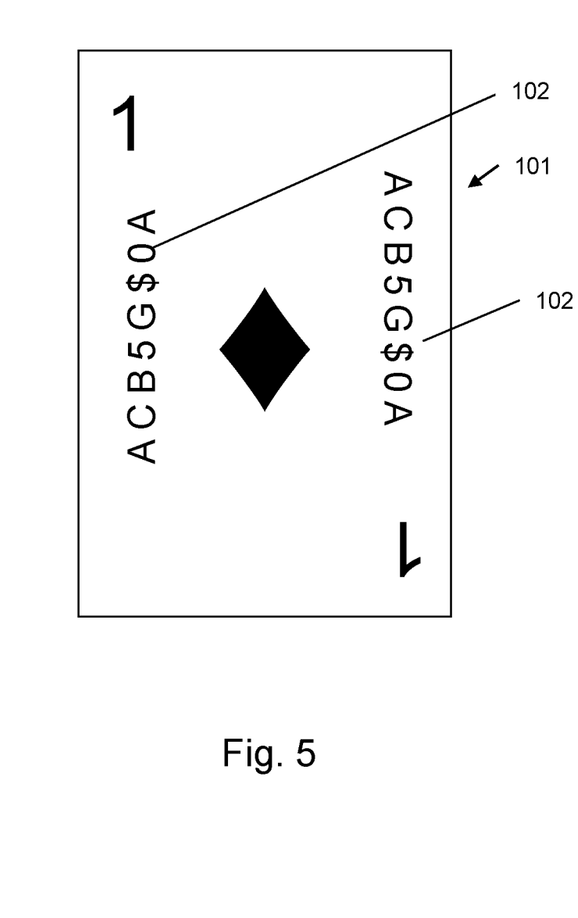
FIG. 5 is a schematical view of a playing card being part of a set of playing cards according to the invention.

An alternative playing card being part of a set of playing cards according to the invention is shown in FIG. 5. The set of playing cards comprises, as an example, 8 decks of 52 cards. Again, N is 416. The playing card 100, in this case the ace of diamonds, carries a card identity code being a string of 8 characters from the alphabet, the numbers 0 to 9 and the special characters &, #, §, $, £ and €, and any other ASCII character.

Figure 6:
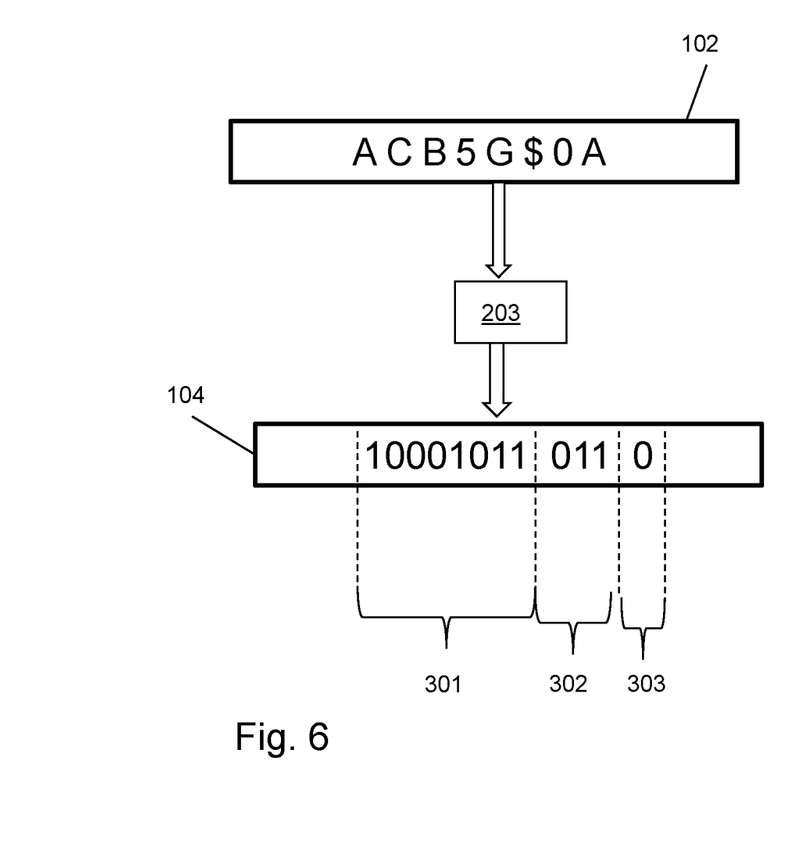
FIG. 6 shows schematically the card identity string of the card of FIG. 5.

As shown in FIG. 6, the card identity string 104, being a binary string of characters 0 and 1, can be obtained by appropriate decryption algorithms 202. This card identity string 104 can constitute out of several character groups 301, 302 and 303. The first group 301 is a string of characters one-on-one linked to the rank and suit of the playing card. So in the example as shown in FIGS. 5 and 6, the ace of diamonds is linked with the string "10110010". All aces of diamond in the set of playing cards will have this string as the first 8 digits in its card identity string.

The second group 302 is a sequence of 3 characters being either 0 or 1. Group 302 equals 000 if the card belongs to the first deck present in the set of playing cards. group 302 equals 001 if the card belongs to the second deck, etc. This means that for this particular card shown in FIG. 5 end 6, the card belongs to the $7^{th}$ deck present in the set of playing cards.

Again, it is understood that this second group 302 of characters may have more than 3 characters, e.g. 4, 5 or more. In an alternative embodiment, this group may e.g. be a random generated group of a given number of characters.

The third group 303 is a control digit. As an example, it represents 0 if the string of digits provided by groups 301 and 302 comprises an even number of "1", and is 1 if the string of digits provided by groups 301 and 302 comprises an odd number of "1".

Figure 7:
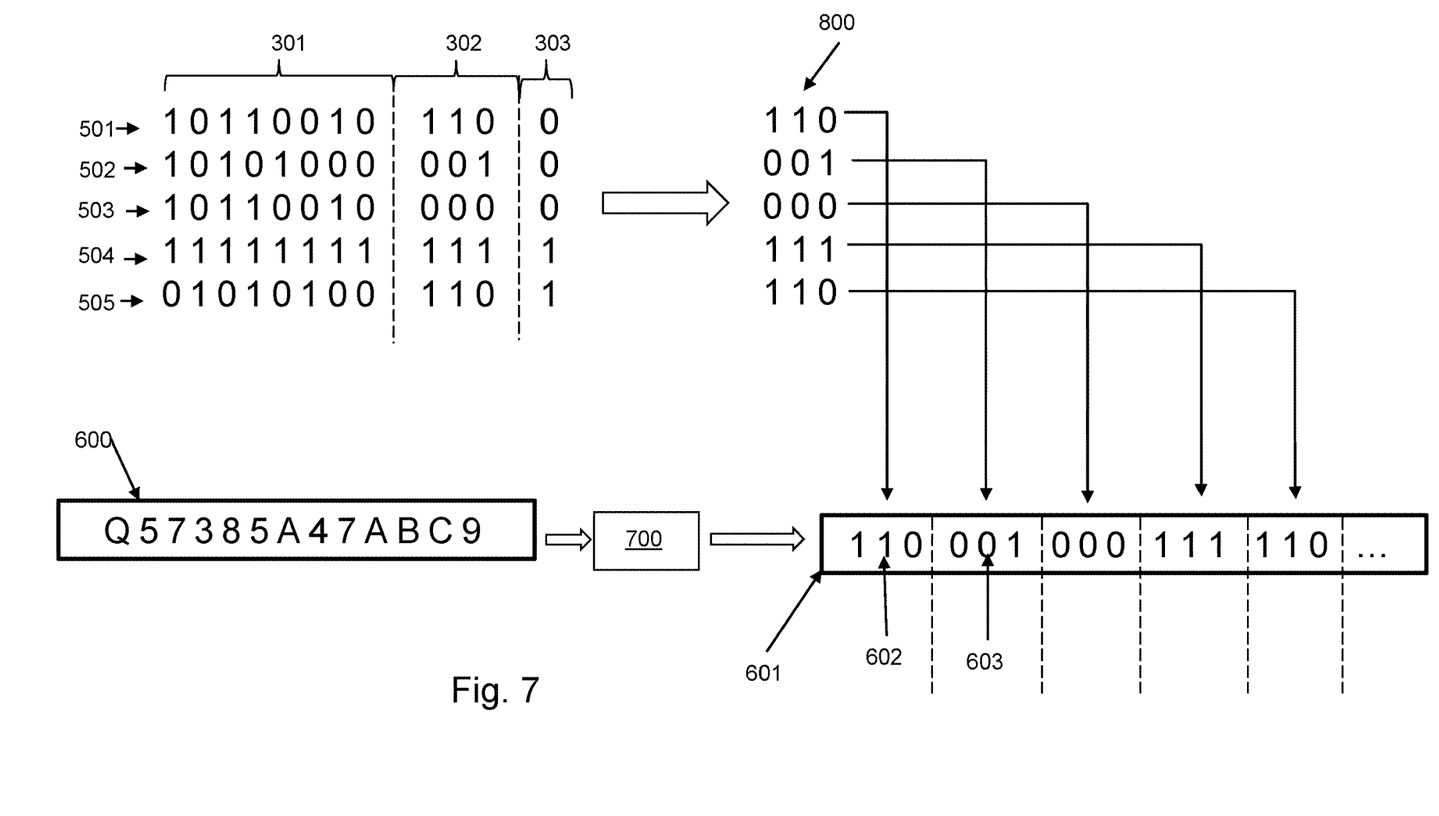
FIG. 7 shows how a set identity string and set identity code is configured out of card identity strings.

FIG. 7 shows 5 card identity strings of 5 consecutive cards 501 to 505 in the set of playing cards. In this set of plying cards, card 501 is equal to the card 100 of FIG. 8. Card 503 is an ace of diamonds, but from the $1^{st}$ deck of cards in the set.

The set identity code 600 is a series of 8 characters, each character being from the group consisting of the alphabet, the numbers 0 to 9 and the special characters &, #, §, $, £ and €, and any other ASCII character. By means of an appropriate decoding key or algorithm 700, the set identity code 600 can be converted in the set identity string 601. From each card identify string, the group 302 of 3 characters is chosen as the group 800 of R characters, in this embodiment 3 characters. The first 3 characters 602 in the set identity string will be the group 302 of the card identity string 501, i.e. of the first card in the set of cards. The next 3 characters 603 in the set identity string will be group 302 of the card identity string 502, i.e. of the second card in the set of cards, etc.

As such, A packed set of cards having a seal showing the set identify code 600, can be used for playing a card game, e.g. baccarat, during which game the sequence of cards in the set can be monitored whether this sequence equals the original one when the set was created and the set identity string and code were generated.

Figure 8:
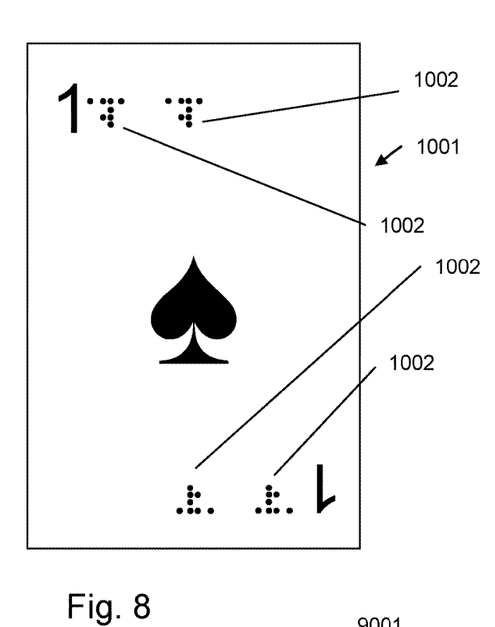
FIG. 8 is a schematical view of a playing card being part of a set of playing cards according to the invention.

An alternative playing card being part of a set of playing cards according to the invention is shown in FIG. 8. The set of playing cards comprises, as an example, 8 decks of 52 cards, so 416 cards. N is 416. The playing card 1000, in this case the ace of spades, carries a card identity code, in this case four times, being a micro-dot image code 1002. It is understood that instead of a microdot code, the code can be a QR code which can be located on the same place as the microdot code, or e.g. beneath and adjacent right of the rank indication of the card.

Figure 9:
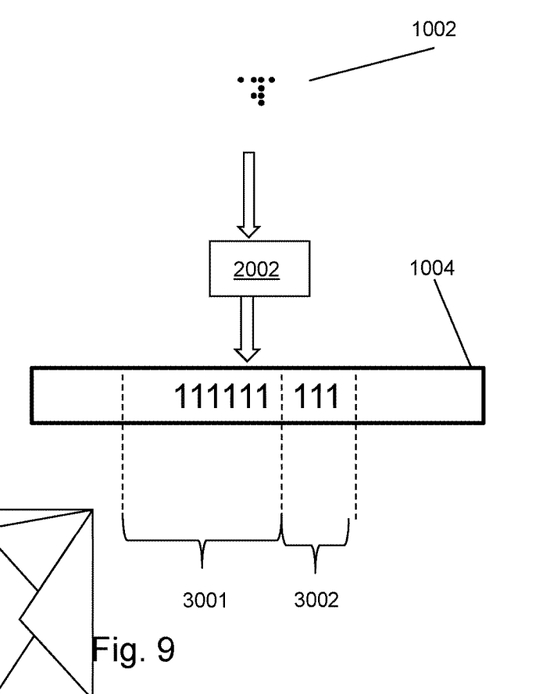
FIG. 9 shows schematically the card identity string of the card of FIG. 8.

As shown in FIG. 9, the card identity string 1004, being a binary string of characters 0 and 1, can be obtained by appropriate decryption algorithms 2002. This card identity string 1004 can constitute out of several character groups 3001 and 3002. The first group 3001 is a string of characters one-on-one linked to the rank and suit of the playing card. So in the example as shown in FIGS. 8 and 9, the ace of spades is linked with the string "111111". All aces of spades in the set of playing cards will have this string as the first 6 digits in its card identity string.

The second group 3002 is a sequence of 3 characters being either 0 or 1. Group 3002 equals 000 if the card belongs to the first deck present in the set of playing cards. group 3002 equals 001 if the card belongs to the second deck, etc. This means that for this particular card shown in FIGS. 8 and 9, the card 1000 belongs to the $8^{th}$ deck present in the set of playing cards.

Also here, it is understood that this second group 3002 of characters may have more than 3 characters, e.g. 4, 5 or more. In an alternative embodiment, this group may e.g. be a random generated group of a given number of characters.

Figure 10:
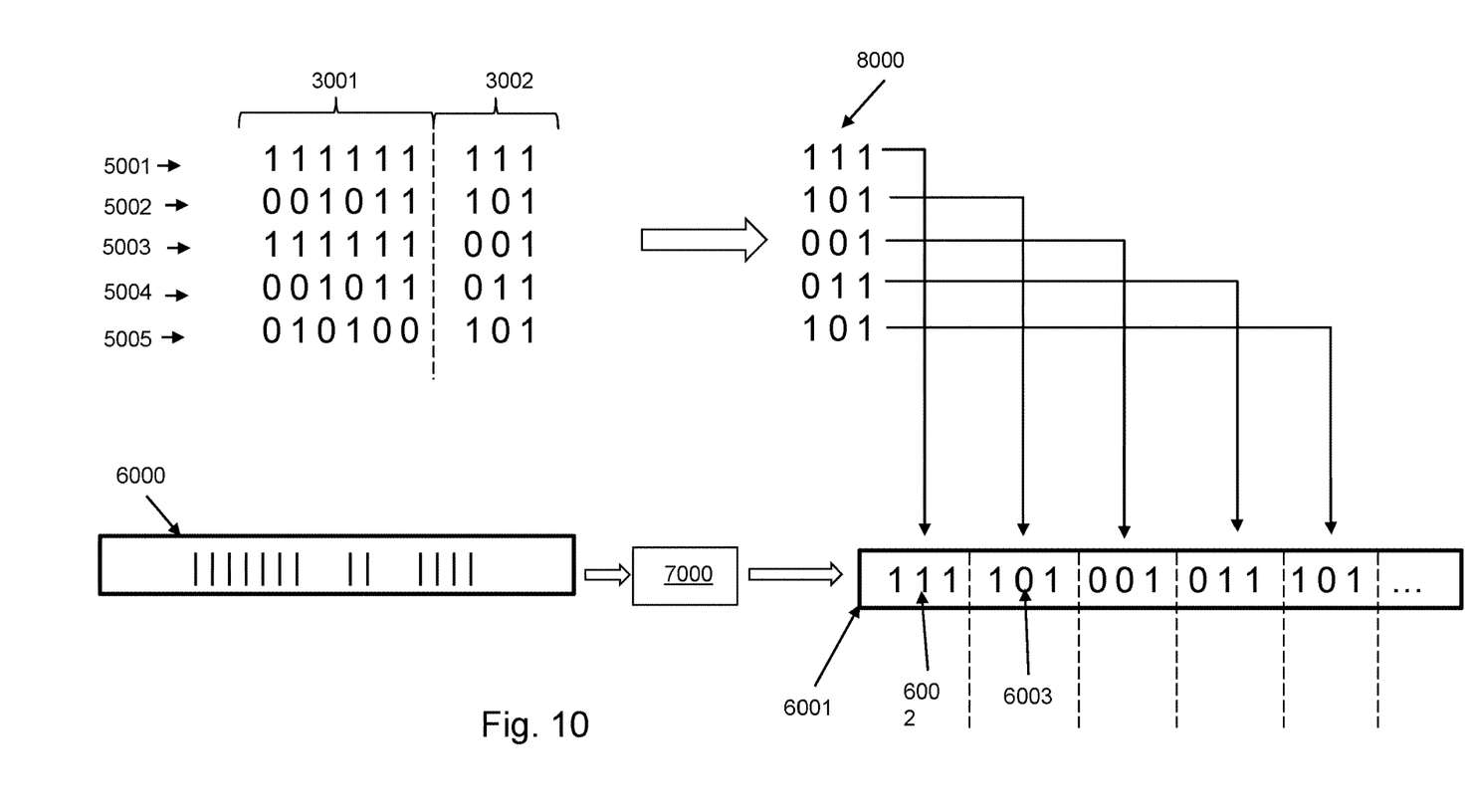
FIG. 10 shows how a set identity string and set identity code is configured out of card identity strings.

FIG. 10 shows 5 card identity strings of 5 consecutive cards 5001 to 5005 in the set of playing cards. In this set of plying cards, card 5001 is equal to the card 1000 of FIG. 8. Card 5003 is an ace of spades, but from the $2^{nd}$ deck of cards in the set.

The set identity code 6000 is a barcode. By means of an appropriate decoding key or algorithm 7000, the set identity code 6000 can be converted in the set identity string 6001. From each card identify string, the group 3002 of 3 characters is chosen as the group 8000 of R characters, in this embodiment 3 characters. The first 3 characters 6002 in the set identity string will be the group 3002 of the card identity string 5001, i.e. of the first card in the set of cards. The next 3 characters 6003 in the set identity string will be group 3002 of the card identity string 5002, i.e. of the second card in the set of cards, etc.

Figure 11:
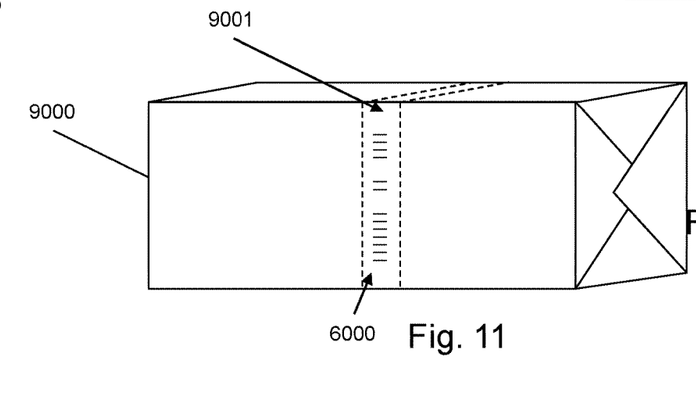
FIG. 11 shows a set of cards according to the invention.

As such, as shown in FIG. 11, a packed set of cards 9000 having a seal 9001 showing the set identify code 6000, can be used for playing a card game, e.g. baccarat, during which game the sequence of cards in the set can be monitored whether this sequence equals the original one when the set was created and the set identity string and code were generated.

It is to be understood that although preferred embodiments and/or materials have been discussed for providing embodiments according to the present invention, various modifications or changes may be made without departing from the scope and spirit of this invention.

The invention claimed is:

1. A set of playing cards, said set comprising N playing cards, N>1, each playing card having a detectable card identity string, said card identity string being a series of M characters, said set of playing cards being provided with a set identity string, said set identity string being composed of N groups of R characters, R<=M, each card identity string providing to the set identity string one group of R characters taken from the series of M characters of this card identity string, the sequence of said N groups of R characters in the set identity string is identical to the sequence of the N cards in the set of playing cards.

2. The set of playing cards according to claim 1, wherein R<M.

3. The set of playing cards according to claim 1, wherein the card identity string is printed on the face side of the playing card.

4. The set of playing cards according to claim 1, wherein the card identity string is encrypted into a card identity code.

5. The set of playing cards according to claim 4, wherein the card identity code is printed on the face side of the playing card.

6. The set of playing cards according to claim 1, wherein R has a value between 1 and 5.

7. The set of playing cards according to claim 1, wherein the set identity string is encrypted into a set identity code.

8. The set of playing cards according to claim 7, wherein the set of playing cards is packed in a sealed package, the set identity code being printed on the package and/or seal.

9. The set of playing cards according to claim 1, wherein the card identity string comprises information on rank and suit of said playing card.

10. The set of playing cards according to claim 1, wherein the set of playing cards comprises B decks of playing cards, B>1, the card identity strings comprise information on the deck to which the card belongs in the set of cards.

11. The set of playing cards according to claim 1, wherein the card identity strings comprise information on:
   the date and/or time of printing of the card and/or
   the location where the card is printed and/or
   the company printing the card and/or
   the type of game the card is printed for and/or
   the brand of the card and/or
   the casino for which the cards is printed.

12. The set of playing cards according to claim 1, wherein the card identity strings comprise a serial number and/or a random number.

13. The set of playing cards according to claim 1, wherein the group of R characters taken from the series of M characters of the card identity string is a group of R sequential characters out of the series of M characters of this card identity string, the first of the R sequential characters being always the character on the same position in the series of M characters of the card identity strings.

14. The set of playing cards according to claim 1, wherein the card identity string or if applicable the card identity code is printed using a UV visible ink.

15. A method for dealing playing cards from a set of playing cards, comprising:
   providing a set of playing cards according to claim 1;
   providing a dealing shoe which is fit to read the card identity string or if applicable the card identity code;
   reading the card identity string or if applicable card identity code;
   extract and compare the R characters of the card identity string to the characters in the set identity string.

16. The method for dealing playing cards from a set of playing cards, comprising:
   A. Providing a set of playing cards according to claim 1;
   B. Providing a dealing shoe which is fit to read the card identity string or if applicable the card identity code;
   C. Providing a processing unit fit for:
      If applicable decrypting a card identity code into a card identity string;
      If applicable decrypting a set identity code into a set identity string;
      Extracting the R characters from the card identity string and Comparing the R characters from the card identity string with the set identity string;
   D. Inserting said set of playing cards in said dealing shoe;
   E. Providing the set identity string or if applicable card identity code to the processing unit;
   F. Drawing a playing card from the dealing shoe;
   G. Reading the card identity string or if applicable card identity code by the dealing shoe and providing the card identity string or if applicable card identity code to the processing unit;
   H. If applicable decrypt the card identity code to the card identity string;
   I. Extract and compare the R characters of the card identity string to the characters in the set identity string;
   J. Repeat steps F to I as long as step I provides equality between the R characters of the card identity string to the characters in the set identity string;
   K. Signal said deficiency when step I provides non equality between the R characters of the card identity string to the characters in the set identity string.

17. The method for dealing playing cards from a set of playing cards, comprising:
   providing a set of playing cards according to claim 2;
   providing a dealing shoe which is fit to read the card identity string or if applicable the card identity code;
   reading the card identity string or if applicable card identity code;
   extract and compare the R characters of the card identity string to the characters in the set identity string.

\* \* \* \* \*